(12) United States Patent
Lamla

(10) Patent No.: US 6,343,743 B1
(45) Date of Patent: *Feb. 5, 2002

(54) METHOD OF CHECKING AUTHENTICITY OF A DATA CARRIER

(75) Inventor: Michael Lamla, Munich (DE)

(73) Assignee: Giesecke & Devrient GmbH, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,108

(22) PCT Filed: Oct. 23, 1996

(86) PCT No.: PCT/EP96/04603

§ 371 Date: Jun. 17, 1998

§ 102(e) Date: Jun. 17, 1998

(87) PCT Pub. No.: WO97/15905

PCT Pub. Date: May 1, 1997

(30) Foreign Application Priority Data

Oct. 23, 1995 (DE) .......................... 195 39 355

(51) Int. Cl.⁷ ............................. G06K 19/06
(52) U.S. Cl. .................. 235/492; 235/468; 235/487; 235/491; 235/380; 235/451; 235/454
(58) Field of Search ................. 235/454, 492, 235/468, 470, 487, 491, 494, 380, 451; 369/15; 360/2

(56) References Cited

U.S. PATENT DOCUMENTS

| 4,219,599 A | * | 8/1980 | Idelson et al. ............... 428/195 |
| 4,527,051 A | * | 7/1985 | Stenzel ........................ 235/380 |
| 4,783,823 A | * | 11/1988 | Tasaki et al. .................. 382/4 |
| 4,988,126 A | * | 1/1991 | Heckenkamp et al. ......... 283/92 |
| 5,005,873 A | * | 4/1991 | West ........................... 283/92 |
| 5,663,573 A | * | 9/1997 | Epstein et al. ................. 257/40 |
| 5,742,075 A | * | 4/1998 | Burns et al. ................... 257/59 |
| 5,747,928 A | * | 5/1998 | Shanks et al. .............. 313/498 |
| 5,821,688 A | * | 10/1998 | Shanks et al. .............. 313/498 |
| 5,858,561 A | * | 1/1999 | Epstein et al. .............. 428/690 |

FOREIGN PATENT DOCUMENTS

EP        0 589 732 A1 *   8/1993   ......... G06K/19/077

* cited by examiner

Primary Examiner—Michael G. Lee
Assistant Examiner—Uyen-Chau N. Le
(74) Attorney, Agent, or Firm—Bacon &Thomas

(57) ABSTRACT

The invention relates to a method for testing the authenticity of a data carrier with an integrated circuit and is characterized in that a material is provided in an area of the integrated circuit which is excited to luminesce for example by an electromagnetic radiation or by an electric field, the electromagnetic radiation emitted by the material being measured and evaluated for determining the authenticity of the data carrier.

21 Claims, 3 Drawing Sheets

METHOD OF CHECKING AUTHENTICITY OF A DATA CARRIER

This invention relates to a method for testing the authenticity of a data carrier according to the preamble of claim 1.

A method of this kind is known e.g. from EP 0 313 967 A1. In this method the physical structure of the integrated circuit is influenced selectively during chip production and the integrated circuit thus provided with certain features which are evaluable as physical properties characteristic of the circuit. In this connection this print proposes providing the integrated circuit with a metallic coating having a random surface structure which is scannable at several places via a resistance measurement, the thus obtained resistance profile being stored in the form of characteristic data for determining the authenticity of the data carrier. However, the detection of such a random surface structure is elaborate and difficult in terms of measurement technology WO 94/15318 likewise discloses a method according to the preamble of claim 1. In this known method the physical property for testing the authenticity of a data carrier is determined from an irreversibly adjustable electric state of a circuit separately present on the integrated circuit. The electric property of the circuit is used for producing a characteristic value for the data carrier and evaluated for determining authenticity. Although the irreversibly adjusted electric state characteristic of the integrated circuit is easy to detect in terms of measurement technology, this test method requires additional circuit complexity in order to permit the authenticity of the data carrier to be tested.

The problem of the invention is to propose a method for testing the authenticity of a data carrier which permits reliable authenticity testing with low technical effort.

This problem is solved according to the invention by the features stated in claim 1.

The basic idea of the invention is to provide in at least one area of the integrated circuit of the data carrier a material which is energetically excitable, at least one characteristic property of the electromagnetic radiation emitted by the material being measured and evaluated for determining the authenticity of the data carrier. Since measurement is done contactlessly in the inventive method, authenticity can be tested independently of the data exchange defined in a transmission protocol.

The excitation is preferably effected by an electromagnetic radiation supplied to the material externally, the radiation emitted by the material being measured optically. However, the material can also be excited by an electric field produced by means provided on the integrated circuit of the data carrier. According to a development, the measured electromagnetic radiation can be converted into a binary value characteristic of the integrated circuit which can be stored in a memory of the integrated circuit. If the binary characteristic value derived from the measured electromagnetic radiation correlates with the characteristic value read from the memory of the data carrier, the integrated circuit and thus the data carrier are recognized as authentic. The resident characteristic value can additionally be linked in the integrated circuit of the data carrier with variable information transmitted to the data carrier from an external device, e.g. a random number produced by the device, to form output information and transmitted to the device, then being evaluated by the device for determining the authenticity of the data carrier.

One preferably uses a semiconductor material such as porous silicon that is monolithically integrable into the integrated circuit. For the physical properties of porous silicon, reference is made to the content of the literature "Porous Silicon; A silicon structure with new optical properties," F. Buda and J. Kohanoff, in Prog. Quant. Electr. 1994, Vol. 18, pages 201–227. This literature describes in detail the laws underlying the luminescence of porous silicon. One can of course also use other semiconductor materials (e.g. doped manganese sulfide or cadmium sulfide) which have the property of emitting, when suitably excited, a characteristic electromagnetic radiation which is detectable by measurement technology.

However one can also use, rather than semiconductor materials, e.g. the polymer polyphenylene vinylene (PPV) which emits light when excited by an electric field. This polymer can be applied e.g. in the form of a photoresist to a silicon layer during production of the integrated circuit. The silicon layer forms one of the two electrodes between which the polymer is disposed. The second electrode can be e.g. a metal electrode. The silicon layer with the polymer and also the metal electrode can be covered by a passivating layer. One can also use other suitable materials which have the property of emitting, when suitably excited, an electromagnetic radiation which is characteristic of the material. These materials can be applied to a layer of the integrated circuit e.g. dispersed in lacquers or foils.

By providing a material on the integrated circuit which emits a characteristic electromagnetic radiation when suitably excited, one greatly impedes any simulation or manipulation of data carriers with such an authenticity feature since the production of an integrated circuit with such a material requires a high measure of knowledge and technical skill in the field of semiconductor technology.

Further advantages and developments can be found in the claims and the description of the invention with reference to the figures, in which:

Figure 3A:
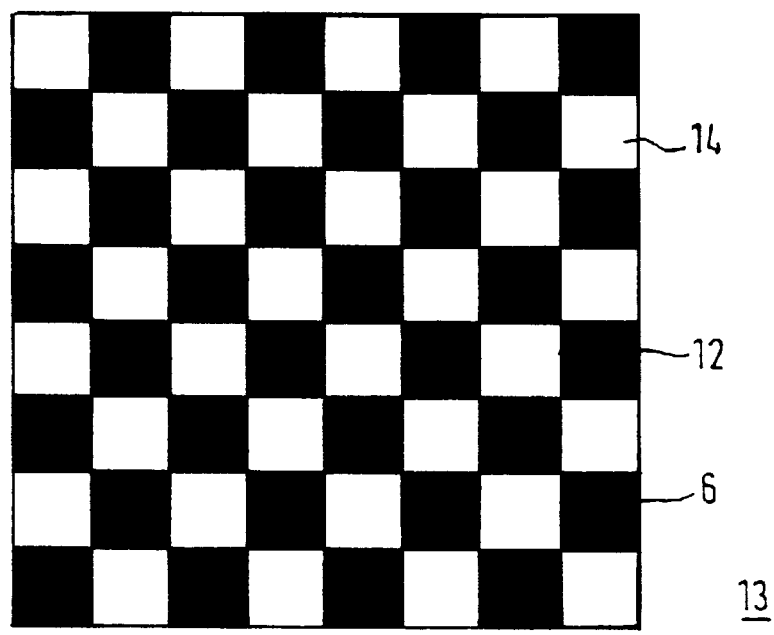
Figure 3B:
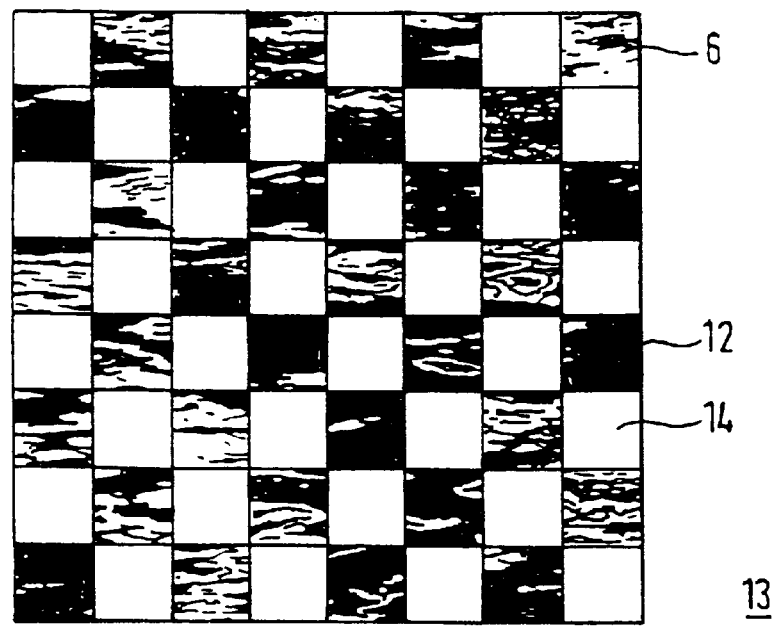
Figure 4:
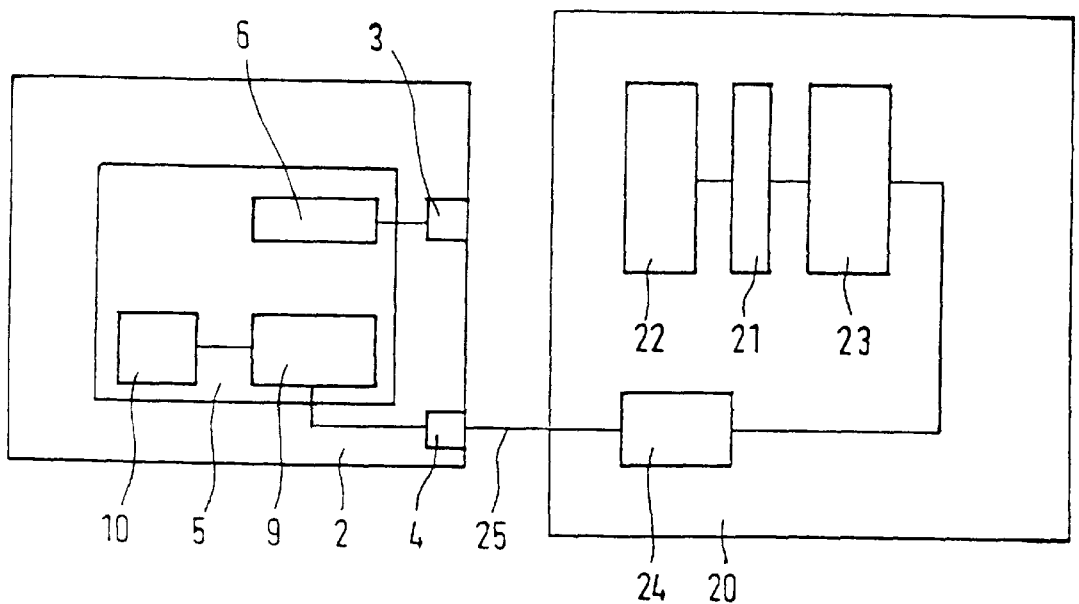
Figure 5:
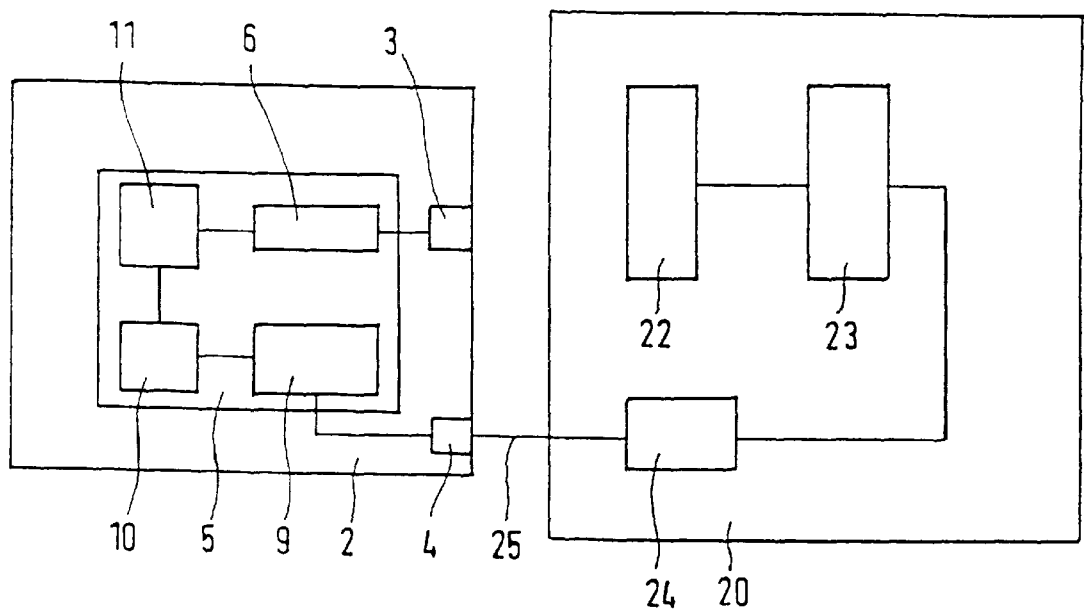

FIGS. 3a and 3b each show an embodiment of the area with the luminescent semiconductor material, FIGS. 4 and 5 each show a data carrier in conjunction with an authenticity testing device.

Figure 1:
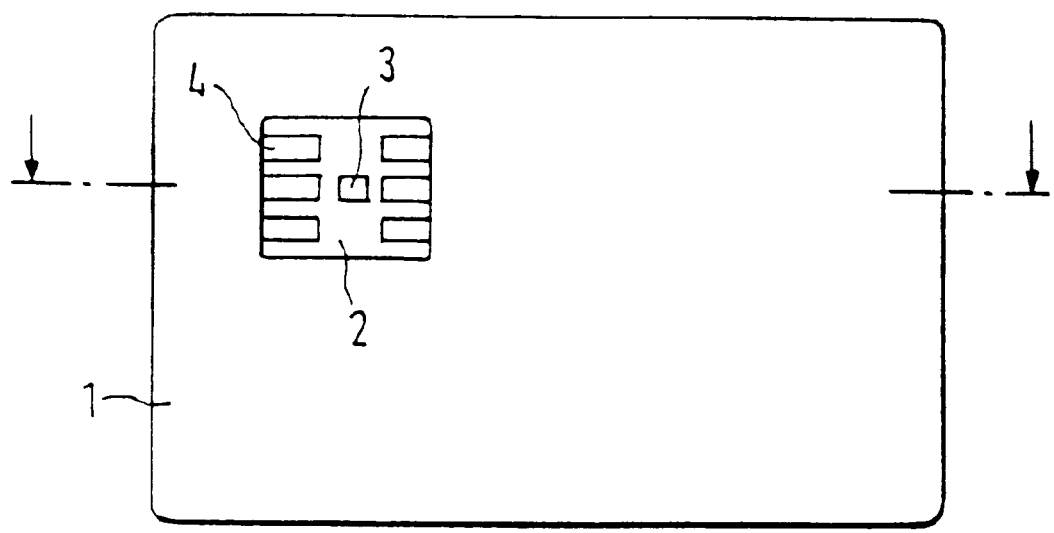
FIG. 1 shows a data carrier with an integrated circuit in a plan view.

FIG. 1 shows a plan view of data carrier 1 as is used e.g. in cashless payment as a debit card or memory card, such as a telephone card. Data carrier 1 has electronic module 2 which can be connected electrically with an external peripheral device not shown via communication elements, e.g. in the form of contact surfaces 4. Communication elements 4 can of course also be executed in the form of a coil or electro-optical elements, as known, in which case data exchange between the data carrier and the device can take place contactlessly. Window 3 is preferably provided in the central area of module 2, being located above the integrated circuit omitted here for clarity's sake.

Figure 2:
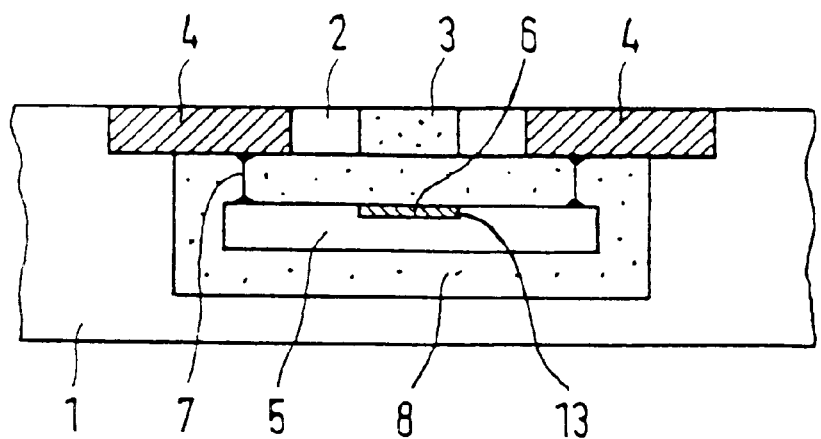
FIG. 2 shows the data carrier in a sectional view.

FIG. 2 shows an enlarged detail of a sectional view of the data carrier of FIG. 1. As can be seen, electronic module 2 includes integrated circuit 5 which is connected electroconductively with communication elements 4 via electric conductors 7. On the side of integrated circuit 5 facing the communication elements there is at least one area 13 having material 6, e.g. porous silicon, which is covered by a passivating layer (not shown here) of the integrated circuit. Material 6 is located below window 3, which can be filled with transparent casting compound 8. As shown here, connecting conductors 7 as well as integrated circuit 5 can also be encased by casting compound 8. This casing ensures good protection of the integrated circuit together with the electric connections during use of the data carrier.

FIGS. 3a and 3b each show an enlarged view of area 13 with material 6. Area 13 includes zones 14 with the nonluminescent silicon and zones 12 with porous silicon 6 which luminesces when suitably excited. Zones 12 with porous silicon 6 can for example be electrically excited by external irradiation with an electromagnetic radiation, as shown e.g. in FIG. 4, or else by means provided on the integrated circuit, as shown in FIG. 5. Each zone 12 of area 13 can have a pair of electrodes associated therewith which can be driven selectively in rows and in columns to electrically excite the particular zone to luminesce. Zones 12 shown in FIG. 3a have a regular structure, i.e. a very largely equal proportion of porous silicon 6. Zones 12 shown in FIG. 3b have an irregular structure, i.e. the zones have different proportions of porous silicon. The proportion and distribution of porous silicon within the zones can be random. The structure of zones 12 is determined by the production process wherein the silicon is e.g. etched electrochemically in an aqueous hydrofluoric acid solution. If no ethanol is used one obtains the random, irregular structures shown in FIG. 3b. These can be e.g. two microns wide and have a length of 2 to 10 microns. The desired size aid spatial arrangement of zones 12 is realized e.g. by using a corresponding mask during the production process. However, this is known and not the subject of the invention and will therefore not be described more closely here.

For the invention it is only of interest in this connection that the size and arrangement of zones 12 within area 13 can be optically imaged onto a photodetector and thus resolved. For determining authenticity the radiation emitted by each zone 12 within area 13 is detected, and in accordance with the measured radiation each zone can have a binary value associated therewith. Binary conversion can be effected e.g. by threshold comparison of the radiation detected for the particular zone with a reference quantity. In the embodiment shown in FIG. 3a, zones 12 yield a class feature for integrated circuits having the same spatial arrangement of zones 12 by reason of the regular structure. In the embodiment shown in FIG. 3b, however, one obtains an individual authenticity feature for each integrated circuit by reason of the random structure of zones 12.

FIG. 4 shows a simplified block diagram of device 20 for testing the authenticity of a data carrier with inventive electronic module 2. For clarity's sake only the module is shown here. Electronic module 2 substantially includes integrated circuit 5 with at least one area 13 having material 6, e.g. porous silicon. In this embodiment material 6 is decoupled from memory and logic elements 9 and 10. Electronic module 2 in addition includes communication elements 4 via which data exchange takes place between integrated circuit 5 and device 20. In this embodiment data exchange takes place via interface 25 in contacting fashion, but it can also be effected contactlessly, e.g. inductively or optically.

Device 20 includes write-read means 24 for accessing at least partial areas of memory 9 of the integrated circuit via communication elements 4 to read and/or write data. Access is suitably controlled by logic means 10 of the integrated circuit. In addition to these means known in the art, the device has means 21 for exciting area 13 with material 6 to luminesce by irradiation with an electromagnetic radiation. Means 21 can be e.g. a laser which excites porous silicon 6 to luminesce in a wave range of from 400 to 650 nm preferably at about 488 mn. The electromagnetic radiation thereby emitted is detected through transparent window 3 by means 22. Measuring means 22 can be for example a photodetector consisting of a row or matrix of photodiodes.

The dimensions of detector 22 are selected so as to be adapted to the dimensions of area 13 with material 6 and of window 3.

Electronic module 2 shown in FIG. 5 additionally includes means 11 for electrically exciting material 6. Means 11 produce the electric field required for electroluminescence with a field strength of e.g. $10^5$ volts per cm. Material 6 can be e.g. porous silicon or else a light-emitting polymer, for example PPV. Means 11 are driven by logic elements 10 belonging to the control device (CPU) of the integrated circuit. Means 11 can e.g. be activated by the control device in accordance with a signal received from device 20.

The authenticity of the data carrier can be determined in the embodiments shown in FIGS. 4 and 5 for example with reference to the spectrum of the electromagnetic radiation emitted by material 6 at a certain wavelength, e.g. about 600 nm The emission spectrum is determined by the excitation spectrum. For determining the authenticity of the data carrier one can also evaluate the dependence between excitation spectrum and emission spectrum, however. Furthermore, one can also link together the emission spectra obtained with different excitation spectra, e.g. by forming differences and evaluating the differences for determining authenticity. For testing authenticity one can also evaluate the spatial arrangement of light-emitting zones 12 within certain area 13 of integrated circuit 5, however, thereby of course optically imaging zones 12 onto photodetector 22 accordingly. The measured emission spectrum or else the relation of excitation and emission spectra can be e.g. a class feature or an individual feature for the circuit.

For testing authenticity one can also use a binary characteristic value, however. The binary characteristic value can result from the spectral distribution of the electromagnetic radiation emitted by material 6, on the one hand, and from the spatial arrangement of light-emitting zones 12, on the other. In the latter case, each bit of the binary characteristic value can have a certain light-emitting zone associated therewith. Means 23 convert the measured radiation emitted by zones 12 into a binary characteristic value which can e.g. be linked with further data contained in the memory of the data carrier. After the integrated circuit has been tested and found good, the characteristic value can e.g. be written to an area of memory 9 protected against change. For testing the authenticity of the data carrier one of course selects the same excitation as during production of the stored characteristic value, the electromagnetic radiation caused by excitation and emitted by material 6 being measured by means 22 and converted in means 23 into the binary characteristic value which is compared by device 20 with the characteristic value read from memory 9 by read-write means 24. If the result of comparison is positive the data carrier is recognized as authentic.

What is claimed is:

1. A method for testing the authenticity of a data carrier with at least one electronic module (2) including at least an integrated circuit with memory and logic elements and elements for communication with an external device which evaluates a physical property determined by the integrated circuit and characteristic of the circuit, characterized by the following steps:

applying a luminescent material (6) directly to at least one area (13) of the integrated circuit (5), exciting the luminescent material (6) to luminesce, detecting the electromagnetic radiation emitted during luminescence, and deriving an authenticity statement about the data carrier (1) on the basis of the detected electromagnetic radiation.

2. The method of claim 1, characterized in that the material is excited by an electromagnetic radiation produced outside the data carrier and supplied to the material or by an electric field produced by the integrated circuit.

3. The method of claim 1, characterized in that the luminescence of the material is evaluated for determining authenticity.

4. The method of claim 3, characterized in that the emission spectrum is evaluated for determining the authenticity of the data carrier.

5. The method of claim 4, characterized in that the relation of emission spectrum and excitation spectrum is evaluated for determining the authenticity of the data carrier.

6. The method of claim 4, characterized in that the emission spectrum is evaluated at a wavelength of about 600 nm.

7. The method of claim 4, characterized in that the difference of the emission spectra obtained with different excitation is evaluated for determining authenticity.

8. The method of claim 1, characterized in that the electromagnetic radiation emitted by the material is converted into a binary characteristic value which is stored in the memory of the integrated circuit.

9. The method of claim 8, characterized in that the binary characteristic value is derived from the spectral distribution of the emitted electromagnetic radiation and/or the spatial arrangement of the light-emitting zones.

10. The method of claim 9, characterized in that the binary characteristic value derived from the detected electromagnetic radiation is compared with the characteristic value read from the memory of the integrated circuit.

11. A system for testing the authenticity of a data carrier, comprising a data carrier (1) having at least one electronic module (2) including at least an integrated circuit (5) with memory elements (9), logic elements (10) and communication elements (4), means (24) for authenticity testing which access at least partial areas of the memory means (9) via the communication elements (4) for reading and/or writing, means (22) for measuring a physical property of the integrated circuit (5), characterized in that the integrated circuit (5) has at least one area (13) with a material (6) excitable to luminesce, the area (13) being disposed such that electromagnetic radiation emitted by the material (6) can reach the measuring means (22), means (11,21) for exciting the material (6) to luminesce, and means (22) for detecting the electromagnetic radiation emitted by the material (6) after excitation of luminescence, and for determining a characteristic property thereof.

12. The system of claim 11, characterized in that the means (21, 22 and 24) are components of a device (20).

13. The system of claim 12, characterized in that the excitation means (21) is a laser and the means (22) is a photodetector having a row or a matrix of photodiodes.

14. The system of claim 11, characterized in that the means (11) for exciting the material (6) is a component of the integrated circuit (5).

15. A data carrier (1) for use in a system for testing the authenticity thereof and having an electronic module (2) including at least one integrated circuit (5) with memory elements (9) and logic elements (10) and elements (4) for communication with an external device (20), characterized in that the integrated circuit (5) is provided with at least one area (13) formed of a material (6) excitable to luminesce, said area being disposed such that electromagnetic radiation emitted by the material (6) upon luminescence is detectable by a measuring means (22), wherein the area (13) includes light-emitting zones (12) and non-light-emitting zones (14) whose arrangement is characteristic of the data carrier.

16. The data carrier of claim 15, characterized in that a window (3) is provided within the module (2) in the area (13) with the material (6).

17. The data carrier of claim 16, characterized in that the material (6) and the integrated circuit (5) are surrounded by a transparent casting compound (8) which also fills the window (3).

18. The data carrier of claim 15, characterized in that the arrangement of the zones (12) and (14) within the area (13) is a class feature or an individual feature for the integrated circuit (5) of the data carrier.

19. The data carrier of claim 15, characterized in that the material (6) has luminescent properties.

20. The data carrier of claim 19, characterized in that the material (6) is a light-emitting semiconductor or a light-emitting polymer.

21. The data carrier of claim 20, characterized in that the light-emitting semiconductor is porous silicon.

* * * * *